United States Patent [19]
Beuk et al.

[11] Patent Number: 5,774,673
[45] Date of Patent: Jun. 30, 1998

[54] SYSTEM FOR COMMUNICATING BETWEEN A DYNAMIC GROUP OF APPARATUSES

[75] Inventors: Leonardus G. M. Beuk; Anna J. P. M. Engel, both of Eindhoven, Netherlands

[73] Assignee: U.S. Philips Corporation, New York, N.Y.

[21] Appl. No.: 673,882

[22] Filed: Jul. 2, 1996

[30] Foreign Application Priority Data

Jul. 5, 1995 [EP] European Pat. Off. .............. 95201836

[51] Int. Cl.[6] .............................. G06F 13/38; G06F 15/16
[52] U.S. Cl. ................................ 395/200.66; 395/200.79; 370/462; 340/825.5
[58] Field of Search ............................... 395/299, 200.66, 395/497.01, 792, 200.75, 800.4, 200.79; 340/825.5, 825.8; 370/462, 397, 409; 364/DIG. 1, DIG. 2

[56] References Cited

U.S. PATENT DOCUMENTS

| | | | |
|---|---|---|---|
| 4,281,380 | 7/1981 | DeMesa, III et al. | 395/299 |
| 4,493,021 | 1/1985 | Agrawal et al. | 395/200.66 |
| 5,357,508 | 10/1994 | Beuder et al. | 370/397 |
| 5,475,841 | 12/1995 | Takahashi | 395/792 |

FOREIGN PATENT DOCUMENTS

350862A1   9/1985   Germany .

Primary Examiner—Daniel H. Pan

[57] ABSTRACT

The system allows an apparatus, such as a computer or a PDA, to establish communication between a local application and applications in at least one other apparatus. The communication is established when a user of an apparatus triggers execution of a seection application. An active activation unit invites applications in the other apparatuses to join by using a message sending unit to transmit a broadcast frame to all apparatuses, requesting activation of the selected application. The broadcast frame specifies which application is being activated. The active activation unit then determines a communication channel which corresponds to the application and the selected application, stored in storage, is executed by an execution unit. The broadcast frame is received by a message receiving unit in other apparatuses. A passive activation unit verifies whether the receiving apparatus has an application, which corresponds to the specified application and whether such an application needs to be activated. If so, the passive activation unit determines which communication channel corresponds to the application (the same communication channel as determined by apparatus) and uses an execution unit to execute the corresponding application, which is stored in storage. The group of applications, which in this way has been formed, communicates by using group frames. The group frames include a channel field which identifies a communication channel. The formed group of applications uses the communication channel which corresponds to the selected application in the apparatus.

13 Claims, 8 Drawing Sheets

SYSTEM FOR COMMUNICATING BETWEEN A DYNAMIC GROUP OF APPARATUSES

BACKGROUND OF THE INVENTION

The invention relates to a communication system which includes a sending apparatus and a receiving apparatus. The sending has a message sending unit for transmitting a message frame, and the receiving apparatus has a message receiving unit for receiving a message frame.

The invention further relates to an apparatus suitable for use in such a system.

Communication between two apparatuses can occur in many ways. Wireless communication is widely used for communication involving portable apparatuses. For consumer electronics products, infrared light is commonly used as a carrier for wireless communication. In known infrared communication systems, a sending apparatus, such as a and-held remote control, comprises an infrared transmitter and a receiving apparatus, such as a television set, comprises an infrared receiver. The information is transmitted in the form of message frames. The message frames are limited to a maximum size, allowing the transmitting and receiving apparatus to use buffers with a corresponding maximum size for temporarily storing the message frames. By using simple communication protocols and operating at low bit-rates, cost-effective communication is achieved. Typically, the protocols are executed by the main CPU, requiring no dedicated logic or communication ICs in addition to an infrared transmitter or an infrared receiver. A transmission via infrared, however, can easily be disrupted, for instance, by other infrared transmitters operating at the same frequency. In order to increase reliability of such communication systems, acknowledgement mechanisms are used to report correct reception of a transmitted frame. If no acknowledgement frame is received in response to transmitting a message frame, the message frame may be retransmitted. The acknowledgement mechanism can also be used to detect that no communication was possible, for instance, in situations where the maximum operating distance is exceeded or optical contact is broken. To support the acknowledgement mechanism, both apparatuses comprise an infrared transmitter and an infrared receiver. Such a system is known from DE-A-3508562.

This system describes the communication between two apparatuses, with the sending apparatus generating message frames and receiving acknowledgement frames, whereas the receiving apparatus receives message frames and generates acknowledgement frames in response. The system only has provisions for acknowledged, one way communication between one application in a first apparatus and another application in a second apparatus.

OBJECTS AND SUMMARY OF THE INVENTION

It is an object of the invention to provide a system of the kind set forth in which any apparatus can establish exclusive bi-directional communication between a selected local application and an application in one or more other apparatuses. The communication is exclusive in the sense that no other applications in the apparatuses are involved.

To achieve this object, the system according to the invention is characterised:

in that said system comprises at least three apparatuses; each apparatus being a sending apparatus as well as a receiving apparatus;

in that said message frame comprises a message type field for distinguishing between at least a first and second type of message frame; said first type of message frame, referred to as group frame, further comprising a channel field for identifying a communication channel; said second type of message frame being referred to as broadcast frame;

in that each apparatus comprises:
  storage means for storing at least one application; each application being identified by an application identification, and each application corresponding to at least one application stored in the storage means of another apparatus;
  execution means for executing selected ones of said applications;
  active activation means for actively activating a selected application; said active activating comprising the steps of:
    causing said message sending means to transmit a broadcast frame for requesting the activation of said selected application; said broadcast frame comprising the identification of said selected application;
    determining for said selected application a corresponding communication channel, said communication channel being referred to as first communication channel; and
    causing said execution means to execute said selected application; said application, while being executed by said execution means, communicating to said corresponding applications using group frames, whose channel field comprises the identification of said first communication channel; and
  passive activation means for passively activating an application; said passive activating comprising the steps of:
    upon said message receiving means receiving a broadcast frame which requests the activation of a local application, verifying whether the local application, which corresponds to the application identified by said broadcast frame, needs to be locally activated; and
  if said application needs to be activated:
    determining from the information supplied in said broadcast frame a corresponding communication channel, said communication channel being the same as said first communication channel; and
    causing said execution means to execute said local application; said local application, while being executed by said execution means, communicating using group frames, whose channel field comprises the identification of said first communication channel.

According to the invention, an apparatus can establish communication between a local application and applications in other apparatuses. The apparatus, which takes the initiative to establish the communication, is referred to as actively activating the application; whereas the other apparatuses are referred to as passively activating an application. Applications in each apparatus may join. Once the communication has been established, the communication is exclusive for the applications which have joined. The communication is established in the following manner: when an apparatus A wants to execute a selected application, apparatus A invites applications in the other apparatuses to join by sending a message to all apparatuses (using a so-called broadcast frame), specifying which application is being activated. Apparatus A then determines a communication channel which corresponds to the application. The apparatuses, which received the broadcast frame, verify whether they have an application, which corresponds to the application specified by apparatus A and whether such an application needs to be activated. If so, the apparatuses determine which communication channel corresponds to the application (the same communication channel as determined by apparatus A). Apparatus A executes the specific application and the apparatuses, which have joined, execute the corresponding applications. The group of applications, which in this way has been formed, communicates by using a special type of message frames, called group frames. The group frames comprise a channel field which identifies a communication channel. The formed group of applications uses the communication channel which corresponds to the specific application in apparatus A. Which apparatuses are part of a group corresponding to a specific application depends on which apparatuses were able to receive the initial broadcast frame and which of these apparatuses chose to join. The apparatus which takes the initiative (apparatus A) does not require any pre-knowledge of which apparatuses are present. Each apparatus is equivalent (not unique) with regard to the communication aspects. This has the additional advantage that an apparatus can simply join the system (and later on join groups of applications) by being able to send and receive message frames. No special initialisation procedure is required.

It should be noted that it is known to communicate to a group of apparatuses by assigning unique addresses to the apparatuses. A message frame transmitted by an apparatus comprises the address of a specific receiving apparatus. Only the addressed apparartus will receive the message frame and acknowledge it. Using addresses makes every apparatus unique, from a communication point of view. For the system according to the invention apparatuses do not need to be unique. The invention, therefore, avoids complex procedures involved with unique addressing schemes, such as having to assign large factory-set addresses, resulting in communication overhead, or using specific procedures to choose addresses and inform other apparatuses of the address. Another drawback of unique addresses is that information which is relevant for more than one apparatus, needs to be transmitted several times, each time addressed to another apparatus. It is also known to avoid this by assigning to an apparatus a so-called group address or multicast address in addition to or as part of a unique address. Apparatuses having the same group address all receive the same multicast message addressed to their group. In the system according to the invention, however, the apparatuses are not preassigned to a specific group but may join any group or even several different groups at the same time as is required for the specific applications supported by the apparatus.

It is also known to use subaddresses, such as OSI access points or TCP/IP sockets to differentiate between applications in one system. These mechanisms, however, are: limited to communication between only two apparatuses and require complex initialisation.

An embodiment of a system according to the invention is characterised:
  in that each apparatus comprises channel activation means for locally activating and locally deactivating selective ones of a plurality of communication channels;
  in that said active activating comprises the step of causing said channel activation means to activate said first communication channel;
  in that said passive activating comprising the step of, if said application needs to be activated, causing said channel activation means to activate said first communication channel;
  in that said message sending means is adapted to transmit a group frame only if said channel field of said group frame comprises the identification of a locally activated communication channel; and
  in that said message receiving means is adapted to receive a group frame only if said channel field of said group frame comprises the identification of a locally activated communication channel.

An apparatus only sends and receives a group frame if the communication channel specified in the group frame has been locally activated (implying that the apparatus has an application using that channel). This reduces load in the system by only handling messages which relate to an active application.

A further embodiment of a system according to the invention, where said sending apparatus comprises acknowledge receiving means for receiving an acknowledgement frame, and said receiving apparatus comprises acknowledge sending means for transmitting an acknowledgement frame upon said message receiving means correctly receiving a message frame,
  is characterised in that said acknowledgement frame comprises said channel field;
  in that said acknowledge receiving means is adapted to receive an acknowledgement frame, only if said channel field of said acknowledgement frame comprises the identification of a locally activated communication channel; and
  in that said acknowledge sending means is adapted to, upon said message receiving means correctly receiving a group frame, transmit an acknowledgement frame, whose channel field comprises the same communication channel identification as the channel field of the received group frame.

By also adding the channel field to the acknowledgement frame, the reliability of the system is increased. A receiving apparatus, which receives a group frame, specifying a specific communication channel, transmits in response an acknowledgement frame, which specifies the same communication channel. The apparatus, which sent the original group frame and now receives the acknowledgement frame, can compare the channels specified in both frames and discard the acknowledgement frame if the channels do not match. In this way the apparatus can filter out acknowledgement frames which are intended for other apparatuses.

A further embodiment of a system according to the invention is characterised in that each apparatus comprises:
  detection means for detecting a transmission of a frame;
  first timing means for setting a first timer at a predetermined first time upon said detection means detecting the ending of said transmission; and
  second timing means for, upon said message receiving means correctly receiving a message frame, setting a second timer at a random time with a predetermined upper boundary; said predetermined upper boundary being smaller than said first time;
  in that said message sending means is adapted to transmit a message frame when said first timer is expired and said detection means detects no transmission of another frame; and
  in that said acknowledge sending means is adapted to transmit an acknowledgement frame only if said second timer expires prior to said detection means detecting a transmission of another frame.

In order to achieve reliable and cost-effective communication between a group of apparatuses, the invention uses the following mechanisms:

1. A message frame and an acknowledgement frame form a 'synchronous' pair. Once a message frame has been transmitted, a first time period, governed by the first timer, is reserved exclusively for returning an acknowledgement frame. The use of synchronous pairs ensures that the transmitting and receiving apparatuses can perform the necessary operations sequentially (no parallel activities are required).

2. A message frame is only acknowledged by one receiving apparatus. For many applications, a sufficient level of reliability is achieved if the transmitting apparatus is informed that at least one apparatus has received the message frame correctly. This is achieved in two ways:

A random delay, governed by a second timer, is used before transmitting the acknowledgement frame. The timer is set upon receipt of a message frame. This reduces the chance of a plurality of apparatuses nearly-simultaneously starting the transmission of an acknowledgement frame. The random delay has an upper boundary, which is less than the first time, ensuring that the transmission of the acknowledgement frame starts before the transmission of another message frame.

The apparatuses detect (sense) whether a frame is transmitted during the random delay period. If so (implying that another apparatus had a shorter delay and has already started transmitting an acknowledgement frame), no other acknowledgement frame is transmitted.

3. Only one apparatus at a time transmits a message frame (followed by the transmission of an acknowledgement frame by a receiving apparatus). The apparatuses detect (sense) whether a frame is being transmitted. If a transmission is detected, no transmission of another message frame is started. At the end of the detected transmission, the first timer is set (ensuring that the pair is not broken). When the timer expires, a transmission of another message frame may start. To ensure that no other apparatus has already started a transmission, an apparatus first checks again whether a transmission is active or not. This mechanism offers a reasonable protection against messages frames interfering with one another, particularly for systems in which relatively few message frames are transmitted and the message frames are transmitted on the initiative of the users.

A further embodiment of a system according to the invention is characterised in that each application of a predetermined first category of applications corresponds to a predetermined, unique communication channel;

in that said active activation means is adapted to, for a selected application which is a member of said first category, use said predetermined communication channel, which corresponds to said selected application, as said first communication channel; and in that said passive activation means is adapted to, if said received broadcast frame identifies an application which is a member of said first category, use the predetermined communication channel, which corresponds to said identified application, as said first communication channel.

In this embodiment, an application of a first category of applications corresponds to a predetermined, unique communication channel. For instance, application "A" corresponds to channel 1; application "B" corresponds to channel 2, etc. When an apparatus takes the initiative to activate a selected application of the first category (active activation), the apparatus uses the communication channel which corresponds to this application. Similarly, apparatuses which activate a corresponding application in response (passive activation) determine from the broadcast frame which application is being started and use the same predetermined communication channel which corresponds to this application. The predetermined correspondence between applications and communication channels is a simple way to ensure that corresponding applications started in different apparatuses use the same channel to communicate.

An alternative embodiment of a system according to the invention is characterised in that: each apparatus comprises channel selection means for selecting a free communication channel; each communication channel corresponding to a sequential number;

said selecting comprising the steps of:
choosing the communication channel with the lowest corresponding number from a predetermined range of numbers; and
testing said chosen communication channel, by:
causing said channel activation means to activate said chosen communication channel;
causing said message transmission means to transmit a group frame, whose channel field comprises the identification of said chosen communication channel;
determining whether said chosen communication channel is being used or not, said chosen communication channel being used if an acknowledgement frame is received; and
if said chosen communication channel is being used:
causing said channel activation means to deactivate said chosen communication channel;
choosing a communication channel with a successively higher number; and
repeating the testing until a free communication channel has been found or until all communication channels corresponding to said predetermined range have been tested.

In this embodiment, an apparatus can select a communication channel which is currently not being used. This opens the way to dynamically use communication channels (i.e. only when required), instead of pre-assigning communication channels to specific applications.

A further embodiment of a system according to the invention is characterised in that said active activation means is adapted to, for a predetermined second category of applications:

cause said channel selection means to select a free communication channel to be used as said first communication channel; and insert an identification of said first communication channel into said broadcast frame for requesting the activation of an application; and in that said passive activation means is adapted to activate the communication channel, which is identified by said received broadcast frame, which requests the activation of an application.

In this embodiment, the communication for applications of a second category is started differently than for applications of the first category. An apparatus, which takes the initiative to activate a selected application of the second category (active activation), selects a free communication channel. The apparatus uses this communication channel for the selected application. The apparatus informs the other apparatuses which communication channel is being used for the selected application by inserting an identification of the channel in the broadcast frame. Using this mechanism, it is not required to reserve a communication channel for each possible application. Instead the number of communication channels can be limited to the numbers of applications which are expected/desired to be active at the same time. The mechanism also allows more than one group of apparatuses to execute the same application, each group using a different channel.

A further embodiment of a system according to the invention is characterised in that said passive activation means is adapted to, if said application needs to be activated, cause said message sending means to transmit a message frame, which accepts the activation of said application; and in that said active activation means is adapted to only cause said execution means to execute said selected application and to only cause said channel activation means to activate said first communication channel, if said receiving means receives at least one message frame, which accepts the activation of said selected application.

In this embodiment, in addition to an acknowledgement frame (which only confirms that the broadcast message has been received correctly), the apparatuses which want to join also send a message frame confirming this. The apparatus, which took the initiative, only activates the application if at least one confirmation is received. This avoids that the application is started and actually no other applications are available to communicate to.

A further embodiment of a system according to the invention is characterised:

in that said passive activation means is adapted to, if said application needs to be activated:

cause said channel selection means to select a free communication channel; said communication channel being referred to as apparatus-specific communication channel;

cause said message sending means to transmit a response message frame, which requests to join said selected application and specifies said apparatus-specific communication channel;

in that said active activation means is adapted to, upon said receiving means receiving at least one response message frame, which requests to join said selected application and specifies an apparatus-specific communication channel:

for each received response message frame, cause said channel activation means to activate said apparatus-specific communication channel;

for a predetermined maximum number of received response message frames, cause said message sending means to transmit a group frame, which accepts the joining and whose channel field comprises the same apparatus-specific communication channel identification as specified by said response message frame;

for the remaining received message frames, cause said message sending means to transmit a group frame, which refuses the joining and whose channel field comprises the same apparatus-specific communication channel identification as specified by said response message frame;

for each received response message frame, causing said channel activation means to deactivate said apparatus-specific second communication channel; and in that said passive activation means is adapted to, if said message receiving means receives a group frame, whose channel field comprises the identification of said apparatus-specific communication channel and which accepts the joining, cause said channel activation means to deactivate said apparatus-specific communication channel;

if said message receiving means receives a group frame, whose channel field comprises the identification of said apparatus-specific communication channel and which refuses the joining:

cause said execution means not to execute said corresponding application; and cause said channel activation means to deactivate said apparatus-specific communication channel.

In this embodiment, the communication is restricted to a predetermined maximum number of applications. To this end, each apparatus which wants to join the communication (passive activation) sends back a message frame requesting to join in response to the broadcast sent by the initiating apparatus (active activation). The initiating apparatus returns an acceptance message for the first response messages, up to a predetermined maximum number, and a refusal message for the remaining response messages. To ensure that an apparatus can distinguish whether an acceptance or refusal message is intended for it (and not for another apparatus), each apparatus, which wants to join, chooses a unique communication channel. The apparatus specifies this channel in its message requesting to join. The initiating apparatus extracts the channel identification from the message and uses this channel to respond with the acceptance or refusal message. Once the applications have been started, the channel selected by the initiating apparatus is used to communicate. In this manner, the initiating apparatus can control how many apparatuses join.

A further embodiment of a system according to the invention is characterised:

in that said passive activation means is adapted to, for a predetermined third category of applications, if said application needs to be activated:

cause said channel selection means to select a free communication channel, said communication channel being used as said first communication channel and said communication channel being referred to as apparatus-specific communication channel cause said message sending means to transmit a message frame, which accepts the activation of the application and specifies said apparatus-specific communication channel; and in that said active activation means is adapted to, after causing said message sending means to transmit a broadcast frame for requesting the activation of an application:

receive a plurality of message frames, which accept the activation of the selected application and specify an apparatus-specific communication channel, said communication channel being used as said first communication channel, and for a predetermined maximum number of received message frames, repeats activating said apparatus-specific communication channel and executing said selected application.

In this embodiment, each passive apparatus, which wants to join following a broadcast frame sent by the initiating apparatus, first selects a unique communication channel. Next, the apparatus specifies this channel in a message informing the initiating apparatus that it accepts to join. The initiating apparatus extracts the channel identification from the message and uses this channel to continue communicating to the apparatus for this application. In this manner, the initiating apparatus in one operation can start the same application many times, each time communicating to an application in another apparatus. So, in fact many independent communication sessions, up to a predetermined number, are established in one operation.

A further embodiment of a system according to the invention is characterised in that said active activation means is adapted to, before causing said execution means to execute said application, cause said message sending means to transmit a group frame, whose channel field comprises the identification of said first communication channel and which triggers the start of said application; and said passive activation means is adapted to cause said execution means to execute said application, only upon said message receiving means receiving a group frame, whose channel field comprises the identification of said first communication channel and which triggers the start of said application.

In this embodiment, the initiating apparatus sends a group message to all apparatuses which want to join, before the initiating apparatus starts the execution of the selected application. The apparatuses, which want to join, start the execution of the application only after receiving the start message. In this manner a synchronised start of the applications is achieved. This is particularly beneficial if more than two applications are involved.

BRIEF DESCRIPTION OF THE DRAWINGS

These and other aspects of the invention will be apparent from and elucidated with reference to the embodiments shown in the drawings.

DESCRIPTION OF PREFERRED EMBODIMENTS

Figure 1:
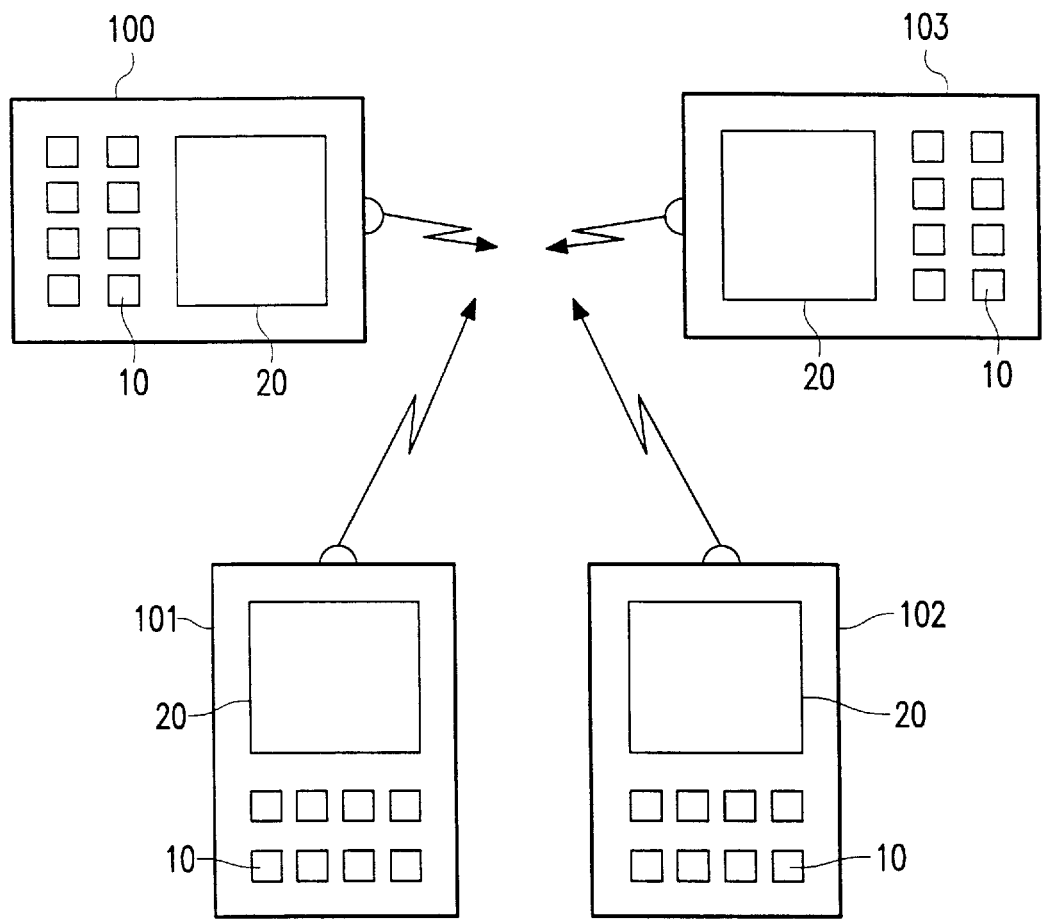
FIG. 1 illustrates a system of four apparatuses, which are able to communicate wirelessly.

The system according to the invention comprises a group of at least three apparatuses, which are able to communicate. Preferably, the apparatuses can communicate wirelessly. FIG. 1 illustrates such a system comprising four apparatuses 100 to 104, which can communicate using infra-red communication. The described system is particularly suited for hand-held communicators. For instance, a group of children, each having a hand-held game computer, can play a group game, by each child providing local input into his game computer and his game computer communicating the relevant information to the other game computers. Moreover, the system also enables children to work together as a team, with each child contributing to the task which the team wants to solve. As an example, the children could solve a complex puzzle, by each child solving part of the puzzle on his game computer and these partial solutions being communicated by his game computer to the other game computers. As another example, a Personal Digital Assistant (PDA) can be extended with various applications, which benefit from group communication. Such a PDA could allow a child to enter a note and send it to the PDAs of all classroom mates. Since groups are established very dynamically (children may come and go), it is not required that a message frame transmitted by an apparatus is received by all apparatuses. It may even give surprising effects if a message pops up on the display of some, but not all apparatuses. This can easily give the impression that the transmitted object has a life of its own. It will be appreciated that an apparatus may be able to execute only one application at a time, but may as well be able to execute several applications (different or the same) in parallel. Some applications may be limited to a defined number of participants (like playing chess requiring two participants); other applications (like solving a crossword puzzle) may be open to all apparatuses.

It will be recognised that the described system is particularly suited for these various types of group applications, where each apparatus is the same from a communication point of view and groups of communicating apparatuses are established dynamically. The simplicity of the described communication system allows cost-effective implementations, which are very important for game computers and children's PDAs. Infrared communication is particularly cost-effective and has the additional advantages that the communication is restrained to one room and is free of governmental regulations. In situations where communication is required over larger distances, for instance neighbouring children who would like to communicate using their PDAs, the same system can be used using simple RF transmission technology, as is known from, for instance, walkie-talkies.

The apparatuses themselves may be different. For example, for interactive television four similar remote controls can be used to communicate to an intelligent interface box. The interface box may, in turn, be connected to the broadcasting studio via a telephone connection. Each user can enter selections or answers on the remote control and transmit these to the interface box. The interface box transmits this information to the studio. Similarly, the studio can transmit data, such as questions, to the interface box, which in turn transmits it to all remote controls. In this example, five apparatuses of two types (four remote controls and one interface box) are involved. The invention only relates to the communication between the five apparatuses. With regard to this aspect, the apparatuses are all the same. With regard to other aspects, such as the interface box additionally being able to communicate to the broadcasting studio, differences may exist, which are outside the scope of the invention.

The system is particularly attractive for a special apparatus with additional functionality. This special apparatus may, for instance, be located in a shop. When the normal apparatuses get near enough the special apparatus, the special apparatus automatically establishes communication. In addition to the applications already present in apparatuses, various other applications can be executed. An example of such an application is a "notice board" application, where apparatuses can prepare and send a short note to the special apparatus, which displays the note on a large screen. Similarly, the large screen could act as a graffiti wall, where drawings made on an apparatus are automatically displayed on the graffiti wall. Advantageously, the special apparatus can also provide new parameters to applications in the apparatuses. For instance, a "fortune telling" application in the apparatus may be provided with new fortunes. It is beneficial for an apparatus to store the new parameters in non-volatile memory, such as an EEPROM on a chip-card. Specifically for communication, in which the special apparatus takes the initiative, it is advantageous that the special apparatus only communicates to one apparatus at a time. It is also beneficial that, if several apparatuses approach the special apparatus simultaneously, many communication sessions can be established in one operation. These communication aspects are covered by the invention.

Besides being equipped for wireless communication, the apparatuses of FIG. 1 will typically comprise input means 10, such as a keypad, and a display 20, such as an LCD display. Preferably, for the display 20 a graphics tablet is used, which also allows input via a pen or finger-presses.

Figure 2:
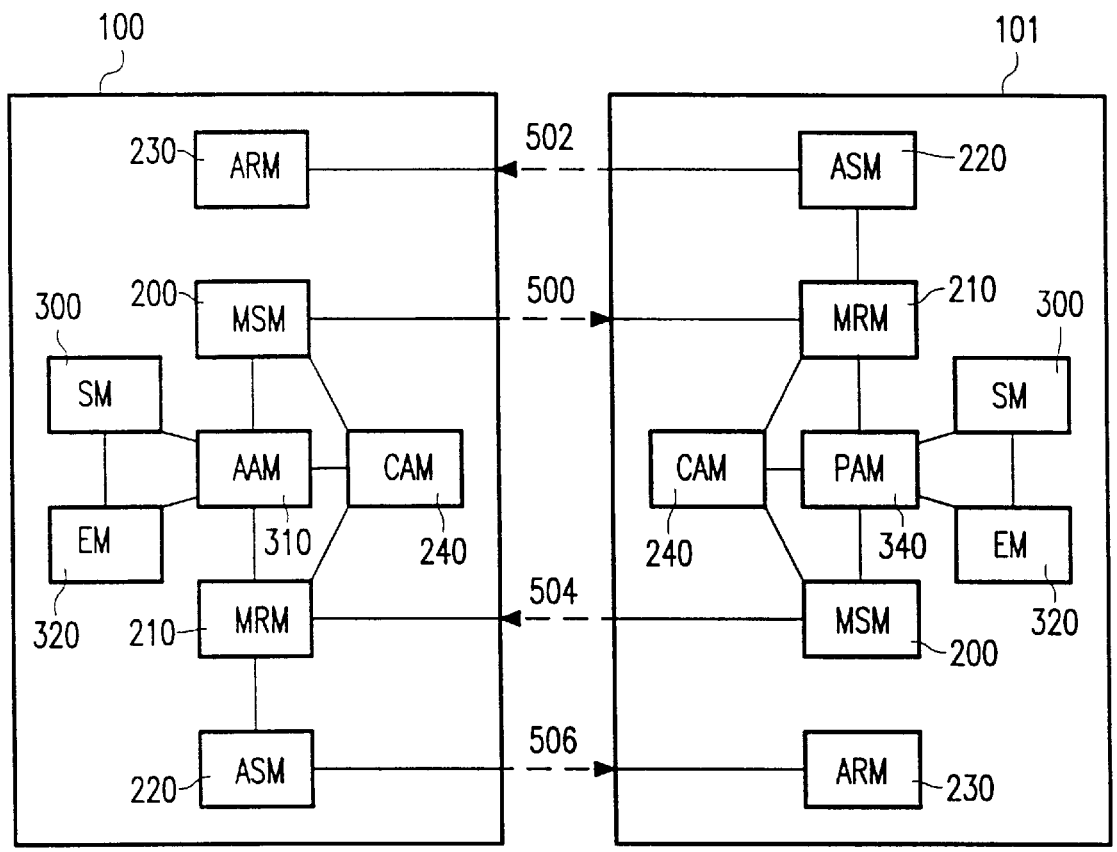
FIG. 2 shows a block-diagram of a first embodiment of an apparatus for a system according to the present invention.

FIG. 2 illustrates a block-diagram of an apparatus for a system according to the present invention. For clarity, only two apparatuses, 100 and 101, are shown. Each apparatus comprises message sending means 200 for transmitting a message frame, message receiving means 210 for receiving a message frame, acknowledge sending means 220 for transmitting an acknowledgement frame when the message receiving means 210 correctly receives a message frame, and acknowledge receiving means 230 for receiving an acknowledgement frame. The system uses two types of message frames: a broadcast frame and a group frame. A broadcast frame is intended to be received by the message receiving means 210 of each apparatus in the system. A group frame is intended to be received by corresponding applications. In some cases, the applications may be active in all apparatuses in the system. In other cases, the applications may only be active in a specific group of apparatuses.

Figure 3:
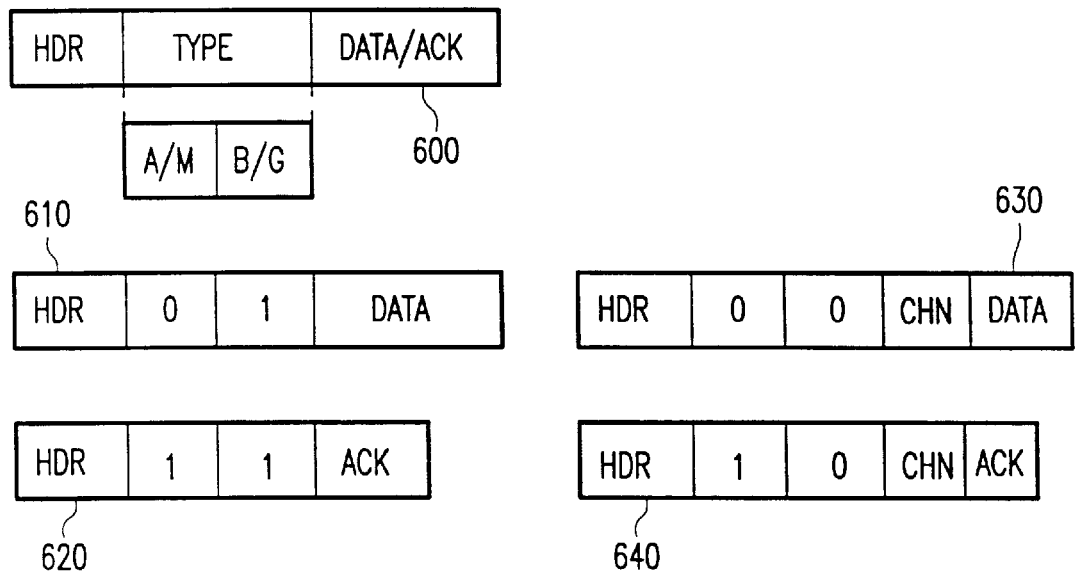
FIG. 3 shows structures of message and acknowledgement frames.

FIG. 3 illustrates a possible overall frame structure 600 used for all frame types. Details are provided for a broadcast frame 610, an acknowledgement frame 620 for acknowledging a broadcast frame 610, a group frame 630, and an acknowledgement frame 640 for acknowledging a group frame 630. A message frame (broadcast frame 610 and group frame 630) contains a DATA field with a variable number of data bytes or bits with a maximum of, for instance, 16 data bytes. Instead of a DATA field, an acknowledgement frame may contain an ACK field of, for instance, one bit, to indicate whether the previous message frame was received correctly. The ACK field could, alternatively, be disposed of, using the fact that an acknowledgement frame is received within a defined time window as a positive acknowledgement and that no acknowledgement frame is received as a negative acknowledgement. To simplify clock-synchronisation of the receiving circuit and the detection of the beginning of a frame, a frame may additionally start with a special header field (HDR), such as a special bi-phase encoded pattern. The group frame 630 also comprises a channel field for identifying a communication channel. The channel field may, for instance, be one byte large, allowing for a maximum of 256 different channels. As shown in FIG. 2, each apparatus comprises channel activation means 240 for locally activating or deactivating specific communication channels. The message sending means 200 only transmits a group frame 630 if the channel field specifies a channel which has been locally activated (i.e. in the sending apparatus) by the channel activation means 240. Similarly, the message receiving means 210 only receives a group frame 630 if the channel field specifies a channel which has been locally activated (i.e. in the receiving apparatus) by the channel activation means 240.

The acknowledgement frame 640 for acknowledging a group frame 630 may comprise the same channel field as used for the group frame 630. In that case, the acknowledge sending means 220 will only transmit an acknowledgement frame, acknowledging the reception of the group frame, if the message receiving means 210 of FIG. 2 correctly receives a group frame, whose channel field species a locally activated channel. The acknowledge sending means 220 copies the channel identification from the channel field of the received group frame to the channel field of the acknowledgement frame. The acknowledge receiving means 230 in the apparatus, which sent the group frame, will discard an acknowledgement frame acknowledging a group frame, if the channel field of the acknowledgement frame does not comprise the identification of a locally activated communication channel. It will be appreciated that this extra mechanism is not used for broadcast frames, which do not use a communication channel. The mechanism improves reliability of the transmission of group frames, but if this reliability is not required the mechanism need not be used. In this case the acknowledgment frame 620 for acknowledging a broadcast frame 610 can also be used for acknowledging a group frame 630.

To distinguish between the various types of frames, the frame comprises a TYPE field. The TYPE field comprises an A/M field and an B/G field. The A/M field is used to distinguish between an acknowledgement frame and a message frame. The B/G field is used to distinguish between the two types of message frame: a broadcast frame and a group frame. It is sufficient to use only one bit for these fields, as shown in FIG. 3.

Obviously, many alternative frame structures can be used to achieve the same result. For instance, by reserving one communication channel for broadcast messages (implying that every apparatus should always activate the reserved channel), the frame structure of a group message can also be used for broadcast messages. This makes the B/G field redundant and may simplify the processing of the frames.

In FIG. 2, apparatus 100 takes the initiative (active activation) to start the execution of an application which requires communication. The initiative may be taken automatically, for instance on the initiative of a program. Alternatively, it may be triggered by an external event, such as a user pressing a key or using a pen to touch a part of the graphics tablet display 20 where an icon is displayed representing a specific application. Various methods for detecting external events, such as a micro-controller scanning a key-board, are known and not described here. The application selected to be started is stored in a storage means 300, such as ROM. More than one application may be stored in the storage means 300, each application being identified by an application identification. Apparatus 100 uses active activation means 310 to activate the selected application. The active activation means 310 constructs a broadcast frame comprising a special "activation request" message for requesting the activation of the selected application. The message is inserted in the DATA field of the broadcast frame. The message also comprises the identification of the selected application. Obviously, the "activation request" message for this application may already have been stored beforehand in the apparatus, making constructing a frame redundant. Next, the active application means 310 uses the message sending means 200 to broadcast the message 500 to all apparatuses, which are currently in the system. Subsequently, the active activation means 310 determines a communication channel, which corresponds to this application. Some methods for determining the channel will be described later on. The active activation means 310 then uses the channel activation means 240 to activate the corresponding communication channel. Execution means 320 are used to execute the application. Until execution of the application is stopped, all group frames sent and received by this application specify this channel in the channel field of the group frame. In this way, this communication channel is exclusively used for the application, for as long as the application is being executed.

The message receiving means 210 of apparatus 101 receives the "activation request" message 500. Obviously, the other apparatuses in the system can similarly receive the message 500. The message receiving means 210 also verifies whether the message has been received correctly. Various methods are known for this, such as checking the bit timing (e.g. bi-phase encoding), checking whether the parity matches parity bits comprised in the message frame or checking whether a calculated checksum, such as a CRC, matches the checksum comprised in the message frame. Based on such a method, a receiving apparatus can come to the conclusion that a message frame has not been received correctly. If no error has been detected the receiving apparatus assumes that the message frame has been received correctly and the acknowledge sending means 220 of the receiving apparatus returns an acknowledgement frame 502. The acknowledgement frame 502 is received by the acknowledge receiving means 230 of apparatus 100. Other apparatuses may also receive the acknowledgement frame, but will discard it, since they did not send a broadcast frame. When the message receiving means 210 receives the "activation request" message 502, passive activation means 340 extracts the application identification from the message. The passive activation means 340 determines which local application corresponds to the identified application. In some cases, this will be the same application as selected in the initiating apparatus (e.g. when two apparatuses are involved in playing chess, the apparatuses will usually execute the same application; the only difference being whose turn it is). In other cases, this may be a complementary application (for instance, using a client-server concept in which the client triggers a certain operation, like making a database query, and the server performs the actual operation and supplies the result). The corresponding application is stored in the storage means 300. Next, the passive activation means 340 verifies whether the corresponding application needs to be locally activated. The passive activation means 340 may take this decision on its own initiative, based on defined rules, such as always starting specific applications and only starting other applications if certain resource are still available.

Alternatively, the passive activation means 340 may interact with the user. If it is decided to activate the corresponding application, the passive activation means 340 uses the channel activation means 240 to activate the corresponding communication channel. The same method to determine the channel is used as used by the active activation means 310 in apparatus 100, resulting in the same channel being activated. Next, the passive activation means uses the execution means 320 to execute the application.

It should be noted that all apparatuses are the same from a communication point of view. This implies that also apparatus 101 comprises the active activation means 310 and that apparatus 100 also comprises the passive activation means 340. This has not be shown in FIG. 2 for clarity.

Normally, only one application in an apparatus will join a group (several apparatuses may join). The mechanism does allow more than one application in one apparatus to join. This can be particularly advantageous if an apparatus supports more than one user at a time, allowing each user to participate to the group application.

Both the message sending means 200 and the acknowledgement sending means 220 transmit a frame. Obviously, both means can partly be combined. For instance, using infrared-based communication, both means could advantageously share an encoding circuit and a modulation circuit, where the encoding circuit is used for encoding the frame into, for instance, a bi-phase signal and the modulation circuit is used for transmitting an infrared light signal onto which the encoded signal is modulated. Typically, the modulation involves modulating the signal onto a subcarrier, which is typically in the range of 33 to 40 KHz., and subsequently modulating the subcarrier onto the infrared carrier. Similarly, the message receiving means 210 and the acknowledge receiving means 230 can share a demodulation circuit for receiving the infrared light signal and demodulating it into an encoded signal. The message receiving means 210 and the acknowledge receiving means 230 can, further, share a decoding circuit for decoding the received encoded signal into a frame. Particularly, if the apparatus already comprises a micro-controller, for example of the type R3000 of MIPS Computer Systems Inc., it is advantageous to combine the message sending means 200, the message receiving means 210, the acknowledge sending means 220, the acknowledge receiving means 230, the active activation means 310, the passive activation means 340 and the execution means 320 with the micro-controller. Typically, the active activation means 310 and passive activation means 340 are functions of the software operating system of the apparatus. Also the storage means 300 may be combined with the micro-controller.

Figure 4:
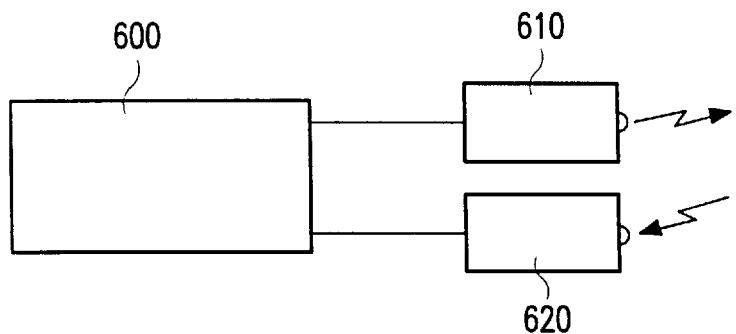
FIG. 4 shows a block-diagram of a micro-controller-based implementation.

FIG. 4 shows an implementation using a micro-controller. A micro-controller 600 uses a modulation circuit 610 for modulating a subcarrier on an infrared light signal. An example of such a modulation circuit, also referred to as infrared LED, is LD2475 of the Siemens AG. A demodulation circuit 620 receives the infrared light signal and demodulates it into a digital signal, which is supplied to the micro-controller 600. An example of such a demodulation circuit is TFNS 5360 of the Telefunken AG. In practice, the modulation and demodulation circuits are kept separate from the micro-controller. In situations where the real-time requirements of the micro-controller allow for this, it is advantageous to combine the first modulation step (modulating the signal onto a subcarrier) with the micro-controller.

Figure 5:
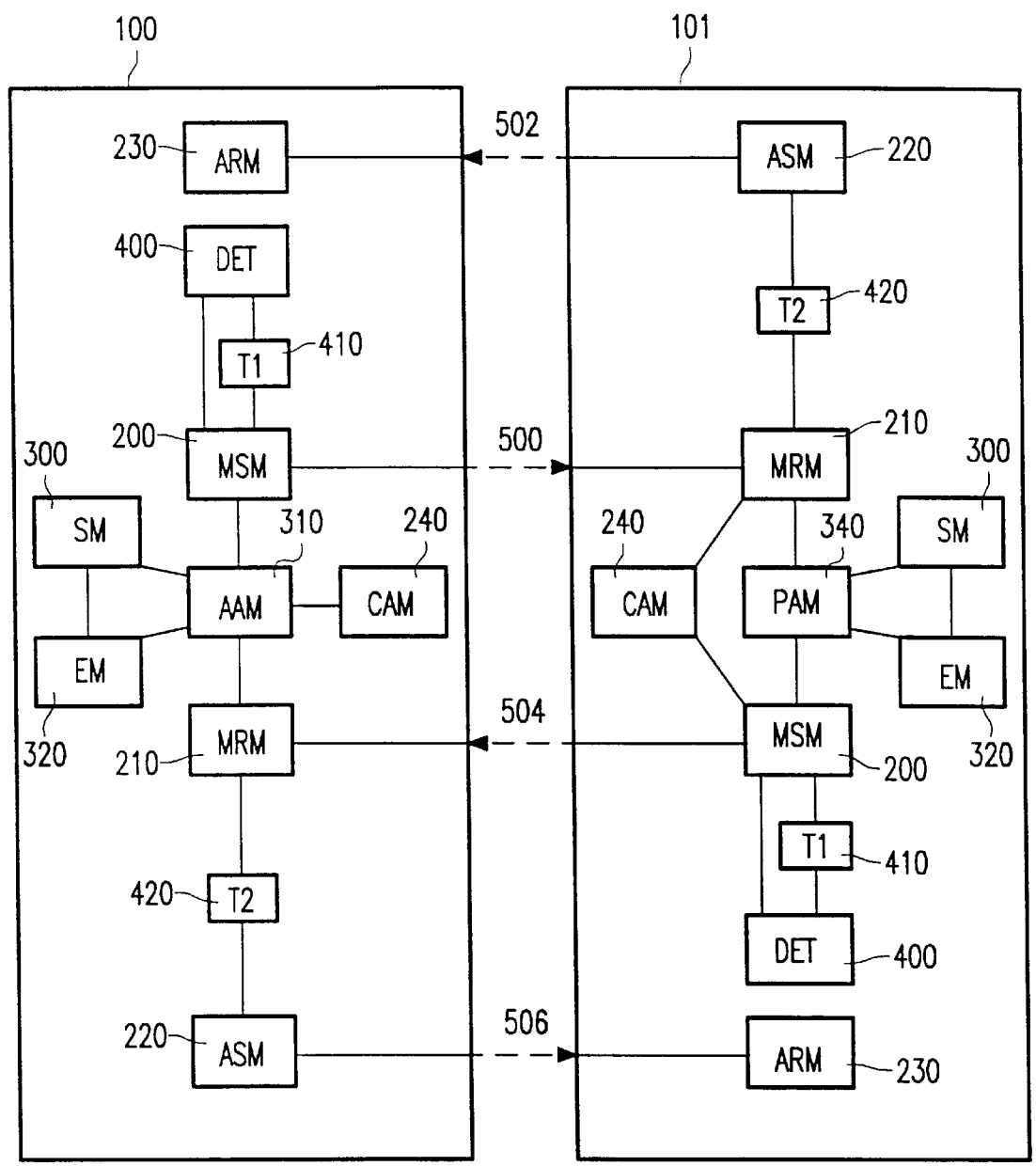
FIG. 5 shows a block diagram of a second embodiment of an apparatus for a system according to the invention.

FIG. 5 shows a further embodiment, in which each apparatus further comprises second timing means 420. When the message receiving means 210 correctly receive a message frame, the second timing means 420 sets a second timer at a random time, with a predetermined upper boundary T2. In this example, this happens when apparatus 101 correctly receives the message frame 500. The acknowledge sending means 220 do not transmit an acknowledgement frame until the second timer expires. Apparatuses other than apparatus 101 may also have correctly received the message frame 500 and started a second timer. The second timer of one of the receiving apparatuses will time-out first. The acknowledge sending means 220 of that apparatus will transmit an acknowledgement frame 502. Each apparatus further comprises detection means 400 for detecting a transmission of a frame. If the detection means 400 of an apparatus, which is waiting for the second timer to expire, detects a transmission of another frame before the second timer expires, no acknowledgement frame is transmitted. Alternatively, the detection means 400 may, upon detecting the transmission of a frame, prevent the second timing means 420 from expiring, also resulting in no acknowledgement frame being transmitted. The use of the random timer and the detection of frame transmissions ensures a high chance of not more than one apparatus acknowledging the message frame 500. If at least one apparatus has received the message frame 500 correctly, the acknowledge receiving means 230 of apparatus 100 will receive an acknowledgement frame 502. Obviously, other apparatuses may detect and receive the same acknowledgement frame 502, but since these apparatuses are not expecting an acknowledgement frame, the frame will be discarded.

Each apparatus can take the initiative to transmit a message frame. Consequently, the transmission of a message frame initiated by a first apparatus could interfere with the transmission of a message frame initiated by another apparatus or with the transmission of an acknowledgement frame. The detection means 400 are also used to reduce the chance of this happening. If the detection means 400 detect a transmission, the message sending means 200 delay starting the transmission of another message frame. When the detection means 400 detect the end of a transmission, first timing means 410 set a first timer at a predetermined first time T1. When the first timer expires, the message sending means 200 may start the transmission of another message frame. Since another apparatus may have been delayed by detecting the same transmission, it is advantageous to check again whether a transmission is active or not, before actually starting the transmission. This mechanism offers a reasonable protection against message frames interfering with one another, particularly for systems in which relatively few message frames are transmitted and the message frames are transmitted on the initiative of the users. It will be appreciated that, instead of setting the timer at the end of detecting a transmission of a frame, the timer may also be set at another moment during the frame transmission, such as the start of the frame. In many systems in which the maximum length (and duration) of a frame are known this will lead to similar results. In some systems, such as for instance infrared based systems, interferences, interpreted by the detection means 400 as a transmission of a frame, can occur which exceed he predetermined first time T1. In such systems it is particularly advantageous to set the timer at the end of detecting the transmission or interference.

Additionally, the predetermined first time T1 is chosen to be longer than the predetermined upper boundary T2 of the second timer set by the second timing means 420. This ensures that a message frame and the corresponding acknowledgement frame form a 'synchronous' pair. Once a message frame has been transmitted, the first time period, governed by the first timer, is reserved exclusively for returning the acknowledgement frame. Advantageously, the use of synchronous pairs ensures that the transmitting and receiving apparatuses can perform the necessary operations sequentially (no parallel activities are required).

The first timing means 410 and second timing means 420 are preferably combined with the timing functions of the micro-controller.

An apparatus may, while it transmits a message frame or an acknowledgement frame, disable any reception of frames. Alternatively, it may be able to receive while it transmits and, advantageously, check for any disturbance of the transmission.

Figure 6:
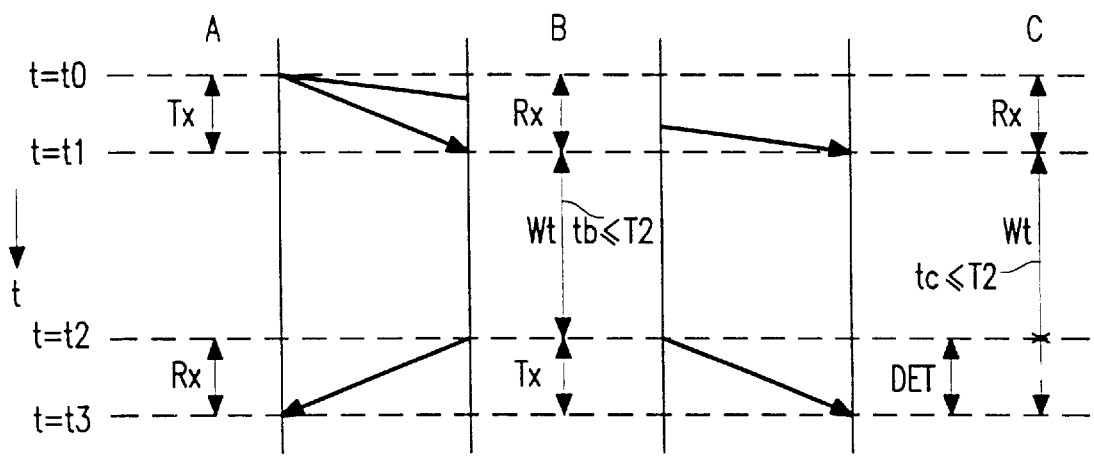
FIG. 6 shows a flow-diagram, illustrating the role of the second timer in avoiding getting two acknowledgements.

FIG. 6 illustrates the use of the second timer in avoiding getting two acknowledgements. As an example, an interaction between three apparatuses A, B and C is shown. The interaction starts at time $t=t_0$. It is assumed that at that moment no other interactions are active and that all timers have expired. At $t=t_0$ A starts sending (Tx) a message frame. At the same time B and C detect the transmission and start receiving (Rx) the message frame. At $t=t_1$ the transmission ends. At this moment B and C have received the message frame and, if no error is detected, both apparatuses start the second timer at a random time, $t_b$ and $t_c$ respectively with a predetermined upper boundary $T_2$ ($t_b \leq T_2$; $t_c \leq T_2$). B and C wait (Wt) for the timer to expire before transmitting an acknowledgement frame. In this example, $t_b$ is the shortest time ($t_b<t_c$). At $t=t_2$ the second timer in B expires. Since B has detected no transmission in between $t=t_1$, and $t=t_2$, B starts transmitting an acknowledgment frame at $t=t_2$. C detects (DET) this transmission also at $t=t_2$, implying that C will no longer transmit an acknowledgement frame.

Figure 7:
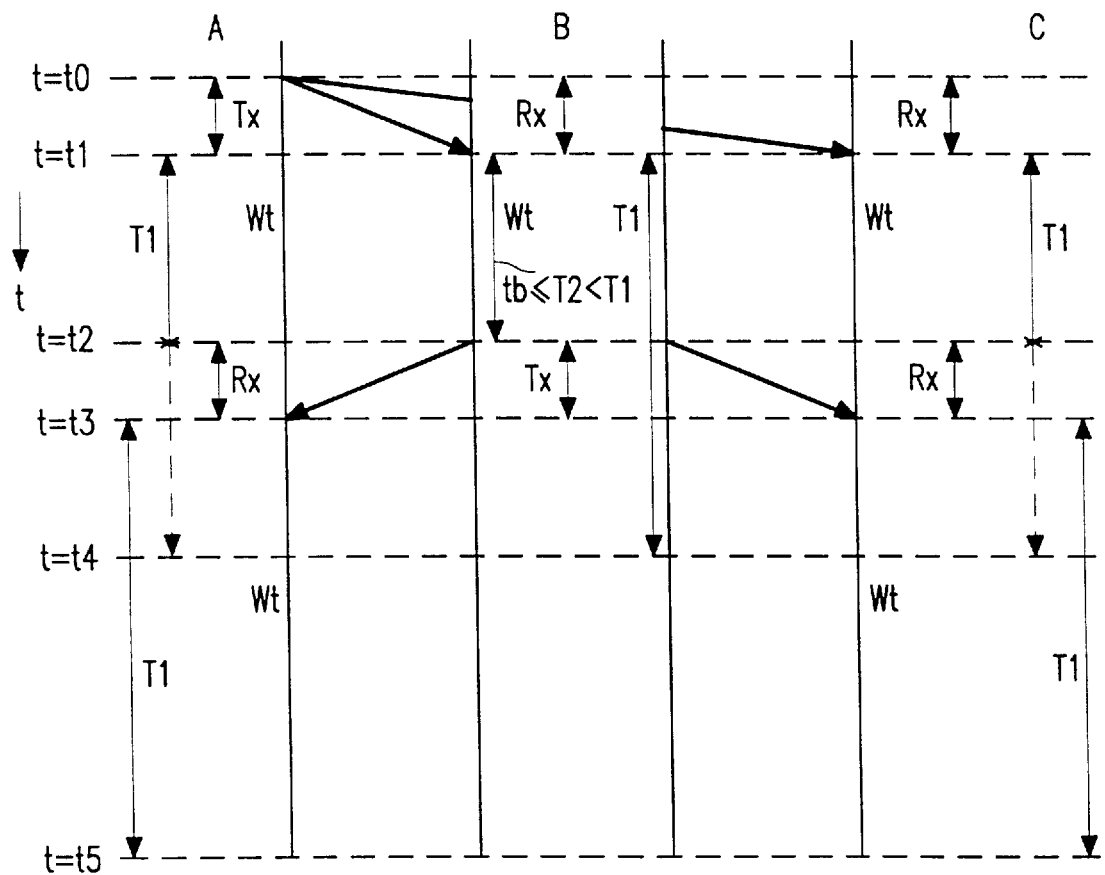
FIG. 7 shows a flow-diagram, illustrating the role of the first timer in avoiding that message frames interfere with one another.

FIG. 7 illustrates the use of the first timer in avoiding that message frames interfere with one another. As an example, an interaction between three apparatuses A, B and C is shown. The interaction starts at time $t=t_0$. It is assumed that at that moment no other interactions are active and that all timers have expired. At $t=t_0$, A starts sending (Tx) a message frame. At the same time B and C detect the transmission and start receiving (Rx) the message frame. At $t=t_1$, A stops transmitting and B and C detect the end of the transmission. A, B and C start the first timer at the predetermined first time $T_1$. They wait (Wt) with transmitting another message frame until the first timer has expired. For simplicity it is assumed that only B has received the message frame correctly (the situation that both receive the message frame correctly has been described previously). B starts the second timer (for acknowledging) at a random time $t_b$ with the predetermined upper boundary $T_2$ ($t_b \leq T_2$). B waits (Wt) for the second timer to expire. This happens at $t=t_2$. Subsequently, B starts transmitting an acknowledgment frame. A and C detect this transmission also at $t=t_2$. At $t=t_3$, B stops transmitting the acknowledgement frame and A and C detect the end of the transmission. A and C restart the first timer at the predetermined first time $T_1$. At $t=t_3$, A has received the acknowledgement frame. Also C may have received the acknowledgement frame and subsequently discard it, since C is not expecting an acknowledgement frame.

Alternatively, C may have stopped receiving the acknowledgement frame as soon as C detected that it was an acknowledgement frame. No transmission of a new message frame is started as long as the first timer has not expired or the transmission of a frame is detected. So, from the start of the transmission of the first message frame at $t=t_0$, no new message frame may be generated until $t=t_4$ for B (first timer expires in B) or $t=t_5$ for A and C (first timer expires in A and C). If B is also able to detect its own transmission, B may also have reset the first timer at $t=t_3$, resulting in the first timer also expiring in B at $t=t_5$. It should be noted that the upper boundary $T_2$ for the second timer is less than the predetermined time $T_1$ for the first timer. This ensures, that the acknowledgement frame is transmitted before a new message frame may be transmitted. In practical implementations, a certain margin of time may be required in between T. and $T_2$ to allow for processing delays. Additionally, the system may use automatic gain control to adapt to the correct levels of the received signals.

In this case, it is beneficial to also define a minimum time for the second timer. In the example of FIG. 6, it could otherwise happen that B almost instantly acknowledges the reception of the message frame, whereas the automatic gain control in A has reduced the sensitivity of the reception circuitry in A while A was transmitting the message frame. As a consequence, A may not be able to receive the acknowledgement frame correctly. The minimum period will allow the automatic gain control circuitry to return to a high level of sensitivity.

A number of alternative methods are used to determine a communication channel to be used for a specific application. Such a communication channel is referred to as the first communication channel. One approach is to reserve for each application (and the corresponding applications in the other apparatuses) a unique communication channel. The correspondence between a specific application and a communication channel is, in such a case, predetermined. Using this approach, both the active activation means 310 and the passive activation means 340 use the same predetermined communication channel, which corresponds to the application, as the first communication channel. Instead of using this approach for all applications which are used in the system or potentially can be used in the system, this approach may be limited to a predetermined first category of applications. This could, for instance, involve those applications which are normally active, which are always present in the system, or which are essential for the system. It will be appreciated, that instead of inserting the identification of the application in the "activation request" message, as an alternative an identification of the communication channel, such as a sequential number, can be inserted in the message.

Figure 8:
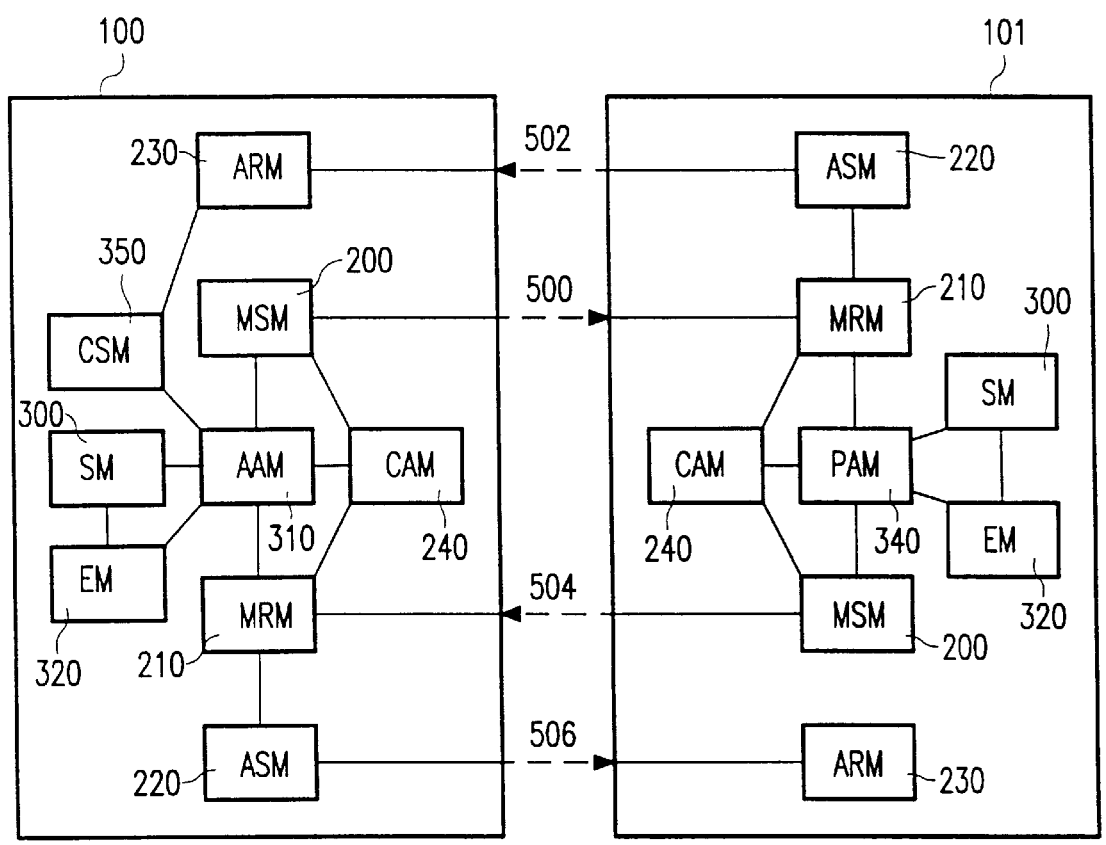
FIG. 8 shows a block diagram of a third embodiment of an apparatus for a system according to the invention.

In an alternative embodiment shown in FIG. 8, the active activation means 310 in the initiating apparatus uses a channel selection means 350 to select a communication channel which is not used by another application at that moment. This communication channel is then used as the first communication channel. To ensure that the passive activation means 340 in the other apparatuses can use the same communication channel as the first communication channel, the active activation means 310 inserts an identification of the communication channel, such as a number, into the "activation request". message. The passive activation means 340 extracts this identification. Similarly as described before, this approach can be used for all applications in the system. Alternatively, this approach may be limited to a predetermined second category of applications. This could, for instance, involve those applications which may not always be present in the system or which are not normally active. Advantageously, of a total of, for instance, 256 channels, the first 128 channels are reserved for applications of the first category (fixed assignment) and the remaining 128 channels are reserved for applications of the second category (dynamic assignment). It should be noted that since all apparatuses are the same from a communication point of view, also apparatus 101 of FIG. 8 comprises the channel selection means 350.

Figure 9:
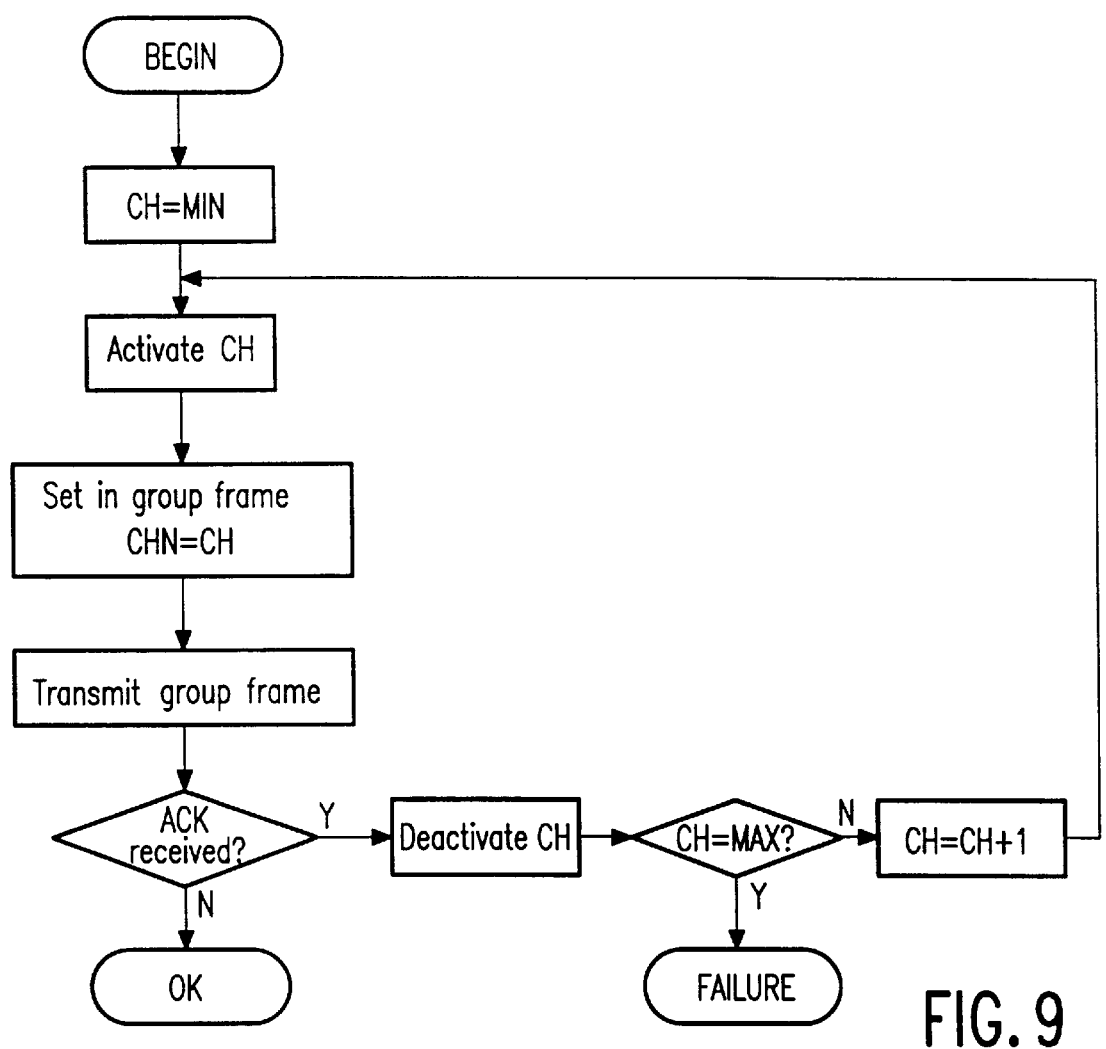
FIG. 9 shows a flow-chart, illustrating the selection of a free communication channel.

FIG. 9 illustrates a flow-diagram for selecting a free communication channel. Each communication channel corresponds to a different serial number. For instance, using a one byte channel field CHN in FIG. 3 the channels could be numbered 0 to 255. To be able to support different categories of applications, as described earlier, the range could be limited to a smaller range. The channel selection means 350 performs the following steps:

1. Choose the channel CH with the lowest number. Let this number be MIN.
2. Use the channel activation means 240 to activate the channel.
3. Construct a group frame and insert the channel CH in the channel field CHN of the group frame; use the message sending means 200 to transmit the group frame.
4. Use the acknowledge receiving means to determine whether an acknowledgement frame has been received.
    a. If so, the channel was already used by another application:
        i. Use the channel activation means 240 to deactivate the channel.
        ii. If all channels have been tested (CH=MAX), no free channel has been found.
        iii. If not all channels have been tested (CH≠MAX), increment the channel (CH=CH+1) and retry by restarting at step 2.
    b. If not, the channel was not used by another application and is, therefore, free.

It should be noted that the group frame, used in step 3, may comprise any message. The only purpose of the frame is to determine whether the channel is used or not. Advantageously, a message may be used which has no data or a special "test" message may be used which is discarded by the receiving apparatuses without causing undesired operations.

Figure 10:
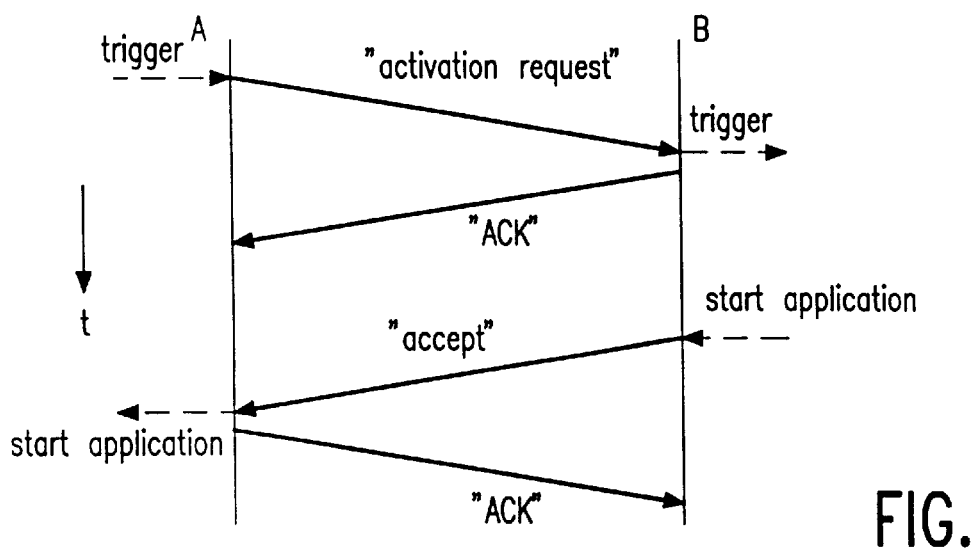
FIG. 10 shows a flow-diagram, illustrating the flow of message frames in a fourth embodiment.

FIG. 10 illustrates the flow of messages in a further embodiment. In this embodiment, apparatus A takes the initiative to start an application. To this end, apparatus A broadcasts the "activation request" message, as described earlier. The message is received by apparatus B and may be by other apparatuses as well. If the message has been received correctly, an acknowledgement frame ACK is returned. This occurs usually immediately following the reception of the frame. The receiving apparatuses then need to decide whether to activate the corresponding application. If at a later moment a positive decision has been taken, the passive activation means 340, as shown in FIG. 2, in the apparatus constructs an "accept" message and uses the message sending means 200 to send the message as a message frame. Only after the message receiving means 210 in apparatus A has received at least one "accept" message (in FIG. 10 apparatus B sends the first "accept" message), the active activation means 310 in apparatus A uses the execution means 320 to execute the application. This mechanism ensures that the application is only started if corresponding applications in other apparatuses are available to communicate to. This is in addition to the use of the acknowledgement frame, which only provides information that other apparatuses are available to communicate to. It should be noted that the "accept" message can be transmitted as a broadcast frame as well as a group frame, using the channel, which has been determined for the application (first communication channel). If a group frame is used, the initiating apparatus must, obviously, first activate the channel. If no group frame comprising an "accept" message is received within a predetermined time window, it is advantageous if the initiating apparatus deactivates the channel.

Figure 11:
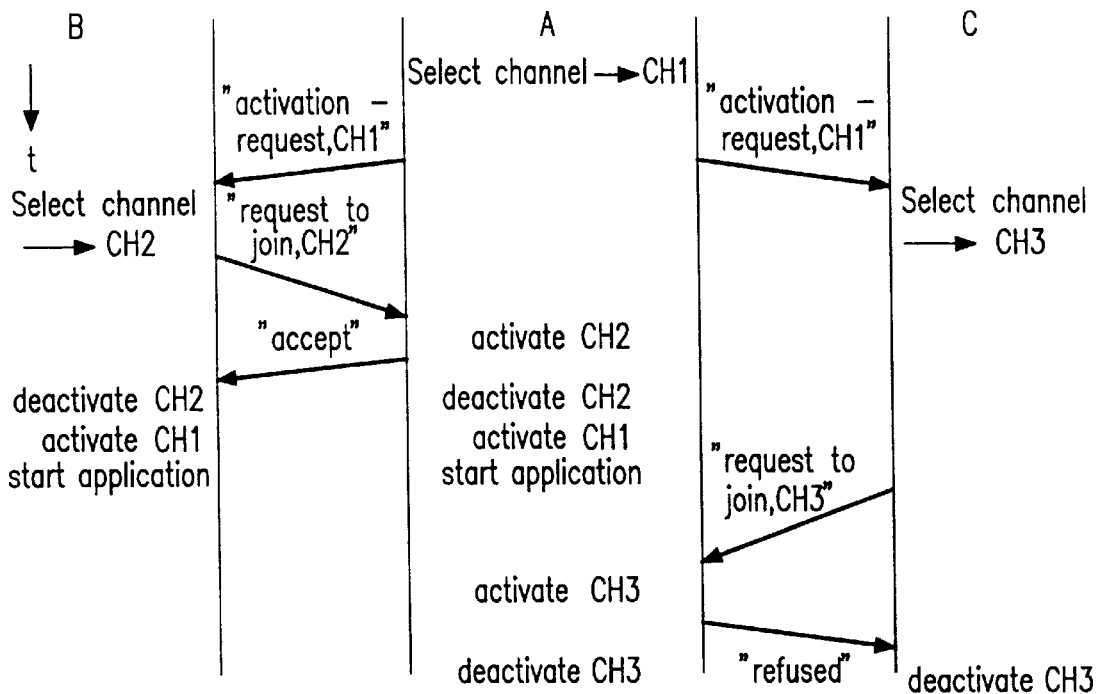
FIG. 11 shows a flow-diagram, illustrating the flow of message frames in a fifth embodiment.

FIG. 11 illustrates the flow of messages in an alternative embodiment. In this embodiment, apparatus A takes the initiative to start an application. To this end, apparatus A broadcasts the "activation request" message, as described earlier. The first communication channel CH1, to be used for communication after the application has been started, is identified in the frame. Unlike in the previous examples, in this embodiment only a limited number of applications are allowed to participate. In the example shown in FIG. 11, only one application is allowed to join (in addition to the application in apparatus A). The "activation request" message is received by apparatus B and C (and maybe by other apparatuses as well). For simplicity, no acknowledgement frames are shown. If apparatus B and C respond to the message, the apparatuses can not yet be sure that they are allowed to join. Apparatus A has to grant permission to each apparatus. To this end, the passive activation means 340 in each apparatus, which receives the "activation request" message and wants to join, uses the channel selection means 350 to select a free communication channel. Since each apparatus performs this selection process independently, each apparatus will select a different free channel, which uniquely identifies the apparatus. In the example shown in FIG. 11, apparatus B selects channel CH2 and apparatus C selects channel CH3. Next, the passive activation means 340 in each apparatus trigger the transmission of a message frame with a "request to join" message. The apparatus-specific channel is also inserted in the message. In FIG. 11 it is assumed that apparatus A receives the "request to join" message of apparatus B first. Since no other apparatuses have yet requested to join, the active activation means 310 of apparatus A accepts that apparatus B joins. To inform apparatus B of this, first the channel activation means 240 are used to activate the unique channel (CH2) for apparatus B. Next, the message sending means 200 are used to send an "accepted" message as a group frame, using CH2, to apparatus B. By using CH2 it is guaranteed that only apparatus B receives the group frame with the "accepted" message. Both apparatus A and B then deactivate CH2. Both apparatus can then start the application and may communicate using the original first communication channel (CH1). At a later moment, apparatus A receives the "request to join" message of apparatus C. Since, in this example, apparatus A only wants to allow one application to join, the active activation means 310 of apparatus A refuses this request. To inform apparatus C of this, first the channel activation means 240 are used to activate the unique channel (CH3) for apparatus C. Next, the message sending means 200 are used to send an "refused" message as a group frame, using CH3, to apparatus C. Both apparatus A and C then deactivate CH3. C does not activate the original first communication channel and does not participate in the application (C does not execute the corresponding local application). It will be appreciated that the same mechanism can be used to allow more than one application to join. Advantageously, the responding apparatuses (B and C) can insert an additional identification, such as the name of the current user of the apparatus, in the "request to join" message. The initiating apparatus (A) can use this information to decide whether the responding apparatus is allowed to join or not. Alternatively, the initiating apparatus may offer the user this choice.

Similarly as described earlier, the "request to join" message can be transmitted as a broadcast frame as well as a group frame, using the first communication channel. If a group frame is used, the first communication channel, obviously, needs to activated and deactivated as required.

Figure 12:
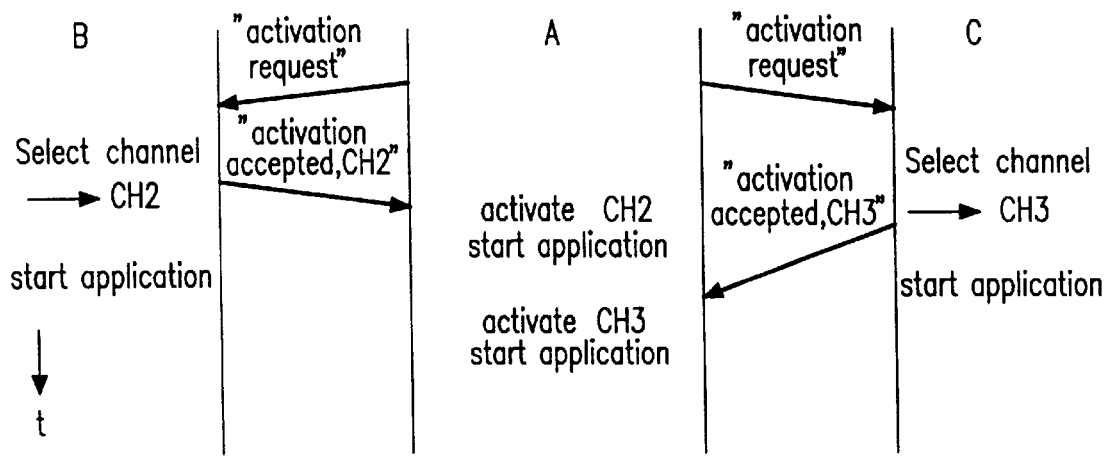
FIG. 12 shows a flow-diagram, illustrating the flow of message frames in a sixth embodiment.

FIG. 12 illustrates the flow of messages in an alternative embodiment. In this embodiment, potentially more than one communication session is established in one operation. Only one application is allowed to join a session (in addition to the application in apparatus A). In the example illustrated in FIG. 12, apparatus A takes the initiative to start an application. To this end, apparatus A broadcasts the "activation request" message, as described earlier. The "activation request" message is received by apparatus B and C (and maybe by other apparatuses as well). For simplicity, no acknowledgement frames are shown. In order for each apparatus to establish an independent communication session with A, the passive activation means 340 in each apparatus, which receives the "activation request" message and wants to join, uses the channel selection means 350 to select a free communication channel. Since each apparatus performs this selection process independently, each apparatus will select a different free channel, which uniquely identifies the apparatus. In the example shown in FIG. 12, apparatus B selects channel CH2 and apparatus C selects channel CH3. Next, the passive activation means 340 in each apparatus trigger the transmission of a message frame with an "activation accepted" message. The apparatus-specific channel is also inserted in the message. For a received "activation accepted" message, the active activation 310 means of apparatus A uses the channel activation means 240 to activate the unique channel for each apparatus (CH2 for apparatus B and CH3 for apparatus C). In this way each apparatus-specific channel acts as the first communication channel. Apparatus A needs not to specify a channel in the original "activation request" message, since this channel would not be used any further. Apparatus A also starts the independent execution of the application for a received message. If the application is able to support many independent communication channels, the application needs only to be started once. Otherwise, the application may need to be started several times. Apparatus B and C each activate the corresponding application. In this way, as a result of one operation an application in one apparatus can establish independent communication with many corresponding applications. Apparatus A may limit the number of independent communication channels to, for instance, only one channel. This may be desired for a simple hand-held apparatus with limited resources. A special apparatus, as described before, may have more resources available and be able to support many independent channels simultaneously.

Similarly as described earlier, the "activation accepted" message can be transmitted as a broadcast frame as well as a group frame. For a group frame to be possible, apparatus A needs to specify a channel in the original "activation request" message, which channel can then be used for the group frame. If a group frame is used, this channel, obviously, needs to be activated and deactivated as required. It should be noted that this channel would only temporary be used, and would not serve as the first communication channel.

Figure 13:
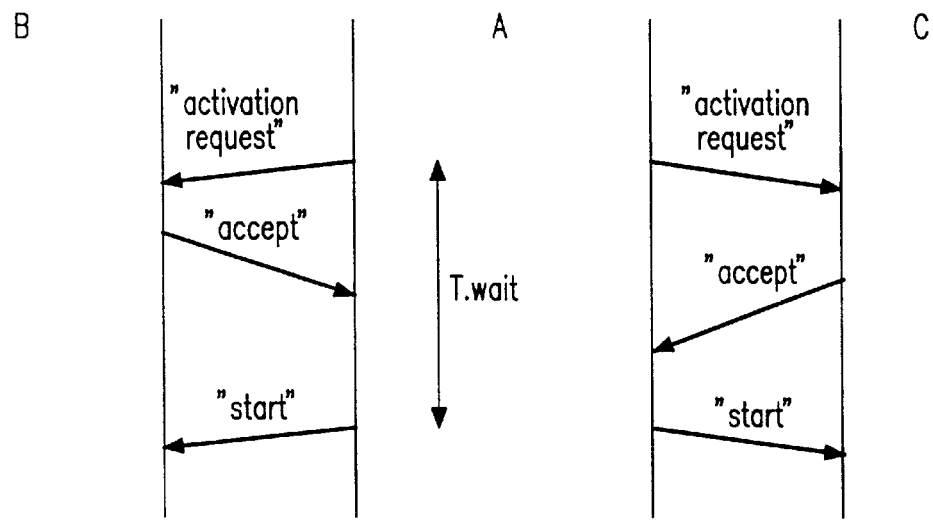
FIG. 13 shows a flow-diagram, illustrating the flow of message frames in a seventh embodiment.

FIG. 13 illustrates the flow of messages in a further embodiment. Using the previously described mechanisms, communication sessions have been established. As a consequence, two or more applications have been started. Since the applications are not started simultaneously, it could happen that the application, which is started first, starts communication before the other applications are ready. The messages will not be accepted (not acknowledged) as long as the corresponding communication channel has not been activated. This could lead to problems, particularly if more than two applications are involved and at least two, but not all, are already active (implying that messages will already get acknowledged but not received by all applications). In this embodiment, the initiating apparatus (which usually starts its application latest), transmits a special "start" message using a group frame using the first communication channel to all applications which are part of the group. Advantageously, the initiating apparatus waits a short while (T_wait), before transmitting the message, allowing the involved apparatuses to fully initialise the corresponding applications. FIG. 13 illustrates the use of the "start" message in addition to the mechanism of FIG. 10. In this example, in addition to the initiating apparatus A two other apparatuses (B and C) are involved. For simplicity, no acknowledgement frames are shown.

The system according to the invention does not use communication addresses (apparatuses are the same and do not have unique addresses). It may, however, be advantageous to comply to a frame structure which has these fields, albeit using the fields only with fixed addresses. This makes it possible to use an existing communication system, where one of the addresses is reserved for the apparatuses according to the invention. While using the reserved address, an apparatus can communicate to the apparatuses of the system according to the invention, following the additional procedures described in this document. Preferably, the same apparatus would also be able to use some of the other addresses to communicate to the rest of the existing communication system, following the basic procedures for that system. As an example, following the basic procedures and frame structure of an existing remote control system, a hand-held game computer according to the invention, can be used as a remote control for a television. If one of the apparatuses in the system is the special apparatus, which, for instance, is located in a shop, it may be advantageous to use another address for this apparatus. This allows the normal apparatuses to easily determine that they are communication to the special apparatus. In such a case, for both addresses (of the normal apparatus and the special apparatus) the communication protocols according to the invention are used. As an alternative to using two different addresses, it is beneficial to reserve a range of communication channels for the exclusive use of communicating with the special apparatus.

Figure 14:
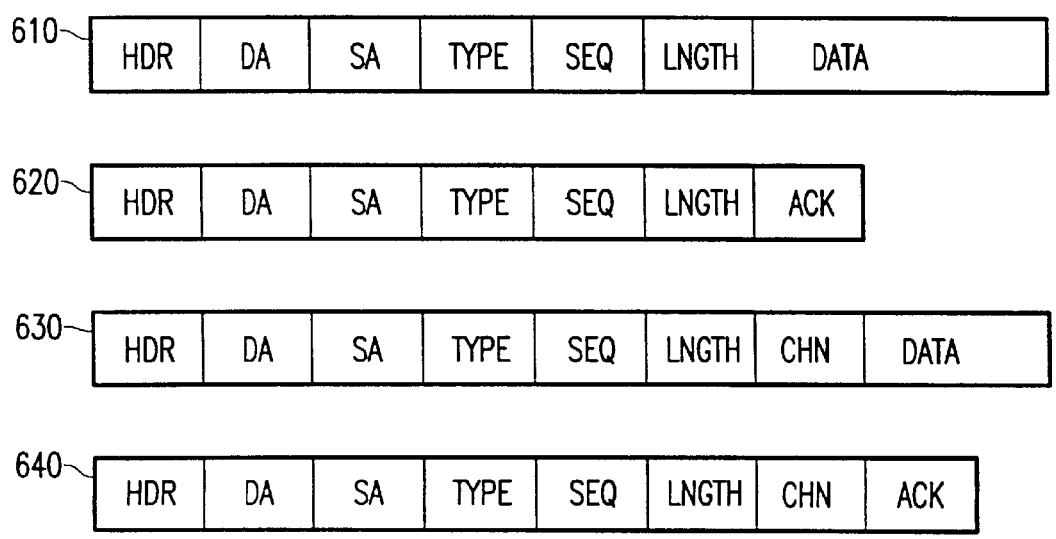
FIG. 14 shows more extensive structures of message and acknowledgement frames.

FIG. 14 illustrates a more extensive frame structure for a broadcast frame 610, an acknowledgement frame 620 for acknowledging a broadcast frame 610, a group frame 630, and an acknowledgement frame 640 for acknowledging a group frame 630. The frame structure includes addressing fields DA and SA, comprising the address of the destination apparatus (DA) and source apparatus (SA). This implies that the source address of the acknowledgement frame 510 comprises the destination address of the received message frame 500 and the destination address of the acknowledgement frame 510 comprises the source address of the received message frame 500. The frame structure also includes a field SEQ for indicating sequence information. This is particularly useful if a message is too large and needs to be divided over a series of frames. The SEQ field could, for instance, comprise a sequence number for successive frames of a series. Additionally, the SEQ field could indicate whether a frame is the start or the end of a series of frames. The frames may also comprise a LNGTH field indicating the length of the following data field. Particularly, if the data size varies significantly, it is advantageous to be able to detect the length of the data in a simple way (for instance to be able to determine when to stop receiving). Obviously, the frame structures can be optimised. For instance, an acknowledgement frame 620 for acknowledging a broadcast frame 610 may not need an ACK field, as has been described before, and as a consequence may not need the LNGTH field. In some implementations even the SEQ field would not be required.

What is claimed is:

1. A communication system comprising:
a sending apparatus;
a receiving apparatus,
said sending apparatus comprising message sending means for transmitting a message frame,
said receiving apparatus comprising message receiving means for receiving a message frame,
said system comprising at least three apparatuses, each apparatus being a sending apparatus as well as a receiving apparatus;
said message frame comprising a message type field for distinguishing between at least a first and second type of message frame, said first type of message frame being a group frame and comprising a channel field for identifying a communication channel, and said second type of message frame being a broadcast frame;
each apparatus comprising:
storage means for storing at least one application, each application being identified by an application identification, and each application corresponding to at least one application stored in the storage means of another apparatus;
execution means for executing selected application of said at least one application;
active activation means for actively activating a selected application, said active activating comprising the steps of:
causing said message sending means to transmit a broadcast frame for requesting the activation of said selected application, said broadcast frame comprising the identification of said selected application;
determining for said selected application a corresponding communication channel, said communication channel being referred to as first communication channel; and
causing said execution means to execute said selected application, said application, while being executed by said execution means, communicating to said corresponding applications using group frames, whose channel field comprises the identification of said first communication channel; and
passive activation means for passively activating an application, said passive activating comprising the steps of:
upon said message receiving means receiving a broadcast frame which requests the activation of a local application, verifying whether the local application, which corresponds to the application identified by said broadcast frame, should be locally activated, and
if said application should be activated:
determining from the information supplied in said broadcast frame a corresponding communication channel, said communication channel being the same as said first communication channel; and
causing said execution means to execute said local application, said local application, while being executed by said execution means, communicating using group frames, whose channel field comprises the identification of said first communication channel.

2. A system as claimed in claim 1, wherein:
each apparatus comprises channel activation means for locally activating and locally deactivating selective ones of a plurality of communication channels;

said active activating comprises the step of causing said channel activation means to activate said first communication channel;

said passive activating comprising the step of, if said application needs to be activated, causing said channel activation means to activate said first communication channel;

said message sending means is adapted to transmit a group frame only if said channel field of said group frame comprises the identification of a locally activated communication channel; and said message receiving means is adapted to receive a group frame only if said channel field of said group frame comprises the identification of a locally activated communication channel.

3. A system as claimed in claim 2, wherein:

said sending apparatus comprises acknowledge receiving means for receiving an acknowledgement frame;

said receiving apparatus comprises acknowledge sending means for transmitting an acknowledgement frame upon said message receiving means correctly receiving a message frame;

said acknowledgement frame comprises said channel field;

said acknowledge receiving means is adapted to receive an acknowledgement frame, only if said channel field of said acknowledgement frame comprises the identification of a locally activated communication channel; and said acknowledge sending means is adapted to, upon said message receiving means correctly receiving a group frame, transmit an acknowledgement frame, whose channel field comprises the same communication channel identification as the channel field of the received group frame.

4. A system as claimed in claim 3, wherein each apparatus comprises channel selection means for selecting a free communication channel;

each communication channel corresponding to a sequential number; and said selecting comprising the steps of:
choosing the communication channel with the lowest corresponding number from a predetermined range of numbers; and
testing said chosen communication channel, by:
causing said channel activation means to activate said chosen communication channel;
causing said message transmission means to transmit a group frame, whose channel field comprises the identification of said chosen communication channel;
determining whether said chosen communication channel is being used or not, said chosen communication channel being used if an acknowledgement frame is received; and
if said chosen communication channel is being used:
causing said channel activation means to deactivate said chosen communication channel;
choosing a communication channel with a successively higher number; and
repeating the testing until a free communication channel has been found or until all communication channels corresponding to said predetermined range have been tested.

5. A system as claimed in claim 4, wherein:

said active activation means is adapted to, for a predetermined second category of applications:
cause said channel selection means to select a free communication channel to be used as said first communication channel; and
insert an identification of said first communication channel into said broadcast frame for requesting the activation of an application; and said passive activation means is adapted to activate the communication channel, which is identified by said received broadcast frame, which requests the activation of an application.

6. A system as claimed in claim 5, wherein;

said passive activation means is adapted to, if said application needs to be activated:
cause said channel selection means to select a free communication channel; said communication channel being referred to as apparatus-specific communication channel;
cause said message sending means to transmit a response message frame, which requests to join said selected application and specifies said apparatus-specific communication channel;

said active activation means is adapted to, upon said receiving means receiving at least one response message frame, which requests to join said selected application and specifies an apparatus-specific communication channel:
for each received response message frame, cause said channel activation means to activate said apparatus-specific communication channel;
for a predetermined maximum number of received response message frames, cause said message sending means to transmit a group frame, which accepts the joining and whose channel field comprises the same apparatus-specific communication channel identification as specified by said response message frame;
for the remaining received message frames, cause said message sending means to transmit a group frame, which refuses the joining and whose channel field comprises the same apparatus-specific communication channel identification as specified by said response message frame;
for each received response message frame, causing said channel activation means to deactivate said apparatus-specific second communication channel; and said passive activation means is adapted to, if said message receiving means receives a group frame, whose channel field comprises the identification of said apparatus-specific communication channel and which accepts the joining, cause said channel activation means to deactivate said apparatus-specific communication channel;

if said message receiving means receives a group frame, whose channel field comprises the identification of said apparatus-specific communication channel and which refuses the joining:
cause said execution means not to execute said corresponding application; and
cause said channel activation means to deactivate said apparatus-specific communication channel.

7. A system as claimed in claim 4, wherein said passive activation means is adapted to, for a predetermined third category of applications, if said application needs to be activated:

cause said channel selection means to select a free communication channel, said communication channel being used as said first communication channel and said communication channel being referred to as apparatus-specific communication channel cause said message sending means to transmit a message frame, which accepts the activation of the application and specifies said apparatus-specific communication channel; and said active activation means is adapted to, after causing said message sending means to transmit a broadcast frame for requesting the activation of an application:
receive a plurality of message frames, which accept the activation of the selected application and specify an apparatus-specific communication channel, said communication channel being used as said first communication channel, and
for a predetermined maximum number of received message frames, repeat activating said apparatus-specific communication channel and executing said selected application.

8. A system as claimed in claim 3, wherein:
each apparatus further comprises:
detection means for detecting a transmission of a frame;
first timing means for setting a first timer at a predetermined first time upon said detection means detecting the ending of said transmission; and
second timing means for, upon said message receiving means correctly receiving a message frame, setting a second timer at a random time with a predetermined upper boundary, said predetermined upper boundary being smaller than said first time;
said message sending means is adapted to transmit a message frame when said first timer is expired and said detection means detects no transmission of another frame; and
said acknowledge sending means is adapted to transmit an acknowledgement frame only if said second timer expires prior to said detection means detecting a transmission of another frame.

9. A system as claimed in claim 1, wherein:
each application of a predetermined first category of applications corresponds to a predetermined, unique communications channel;
said active activation means is adapted to, for a selected application which is a member of said first category, use said predetermined communication channel, which corresponds to said selected application, as said first communication channel; and
said passive activation means is adapted to, if said received broadcast frame identifies an application which is a member of said first category, use the predetermined communication channel, which corresponds to said identified application, as said first communication channel.

10. A system as claimed in claim 9, wherein:
said passive activation means is adapted to, if said application needs to be activated, cause said message sending means to transmit a message frame, which accepts the activation of said application, and
said active activation means is adapted to only cause said execution means to execute said selected application and to only cause said channel activation means to activate said first communication channel, if said receiving means receives at least one message frame, which accepts the activation of said selected application.

11. A system as claimed in claim 9, wherein
said active activation means is adapted to, before causing said execution means to execute said application, cause said message sending means to transmit a group frame, whose channel field comprises the identification of said first communication channel and which triggers the start of said application; and
said passive activation means is adapted to cause said execution means to execute said application, only upon said message receiving means receiving a group frame, whose channel field comprises the identification of said first communication channel and which triggers the start of said application.

12. A communication system comprising a plurality of communication apparatus, each apparatus comprising:
a sending apparatus;
a receiving apparatus,
said sending apparatus comprising message sending means for transmitting a message frame,
said receiving apparatus comprising message receiving means for receiving a message frame,
said message frame comprising a message type field for distinguishing between at least a first and a second type of message frame, said first type of message frame being a group frame and comprising a channel field for identifying a communication channel, and said second type of message frame being a broadcast frame;
storage means for storing at least one application, each application being identified by an application identification, and each application corresponding to at least one application stored in the storage means of another apparatus;
execution means for executing selected applications of said at least one application;
active activation means for actively activating each selected application, said active activating comprising the steps of:
causing said message sending means to transmit a broadcast frame to request activation of the selected application, said broadcast frame comprising the identification of the selected application;
determining for the selected application, a corresponding communication channel, said communication channel being a first communication channel; and
causing said execution means to execute the selected application, said application, while being executed by said execution means, communicating to said corresponding applications using group frames, whose channel field comprises the identification of said first communication channel; and
passive activation means for passively activating an application, said passive activating comprising the steps of:
upon said message receiving means receiving a broadcast frame which requests the activation of a local application, verifying whether the local application, which corresponds to the application identified by said broadcast frame, is to be locally activated, and
if said application is to be activated:
determining from the information supplied in said broadcast frame, a corresponding communication channel, said communication channel being the same as said first communication channel; and causing said execution means to execute said local application, said local application, while being executed by said execution means, communicating using group frames, whose channel field comprises the identification of said first communication channel.

13. A communication system comprising a plurality of apparatuses, each apparatus comprising:

message sending means for transmitting a message frame;

message receiving means for receiving a message frame;

acknowledge sending means for transmitting an acknowledgment frame when the message receiving means correctly receives a message frame;

acknowledge receiving means for receiving an acknowledgment frame; and storage means for storing at least one application, each application corresponding to at least one application stored in storage means of another of said apparatuses of said plurality of apparatuses, each message frame being one of a broadcast frame and a group frame, the broadcast frame being received by said message receiving means of each of said plurality of apparatuses, and the group frame being received by corresponding applications.

* * * * *